US008989334B2

(12) United States Patent
Pryor

(10) Patent No.: US 8,989,334 B2
(45) Date of Patent: Mar. 24, 2015

(54) ANEUTRONIC MAGNETRON ENERGY GENERATOR

(75) Inventor: Roger W. Pryor, Bloomfield Hills, MI (US)

(73) Assignee: Pryor Knowledge Systems, Inc., Bloomfield Hills, MI (US)

(*) Notice: Subject to any disclaimer, the term of this patent is extended or adjusted under 35 U.S.C. 154(b) by 372 days.

(21) Appl. No.: 13/416,576

(22) Filed: Mar. 9, 2012

(65) Prior Publication Data

US 2013/0235964 A1 Sep. 12, 2013

(51) Int. Cl.
*G21B 1/05* (2006.01)
*G21B 3/00* (2006.01)
*H05H 15/00* (2006.01)

(52) U.S. Cl.
CPC .............. *G21B 3/006* (2013.01); *H05H 15/00* (2013.01)
USPC ........................................................ 376/144

(58) Field of Classification Search
USPC .......................................... 376/144, 145, 147
See application file for complete search history.

(56) References Cited

U.S. PATENT DOCUMENTS

| 2,517,120 | A | 8/1950 | Linder | |
| 2010/0062288 | A1* | 3/2010 | Weber et al. | 429/10 |
| 2010/0111258 | A1* | 5/2010 | Reijonen et al. | 378/123 |
| 2011/0216866 | A1* | 9/2011 | Pearson | 376/117 |

OTHER PUBLICATIONS

Stave, S. et al. "Understanding the 11B(p,x)xx reacton at the 0.675 MeV resonance" Physics Letter B, ScienceDirect, pp. 26-290 (2010).
Dee, P.I et al. "The Disintegration of Boron into Three $ /alpha $-Particles" Proceedings of the Royal Society A, Proc. R. Soc. Lond. A 1936, 154 pp. 279-296, doi 10. 1098/rspa. 1936.0051.
Tsimring, Shulim E. "Electron Beams and Micorwave Vacuum Electronics".

* cited by examiner

Primary Examiner — Jack W Keith
Assistant Examiner — Sean P Burke
(74) Attorney, Agent, or Firm — John A. Miller; Miller IP Group, PLC

(57) ABSTRACT

An aneutronic magnetron energy generator that generates microwave energy from a fusion-fission reaction that produces alpha particles in response to a proton colliding with an $^{11}$B nucleus. The magnetron energy generator includes a magnetron having an anode resonator including a central chamber and a plurality of radially disposed cavities. A cathode assembly is provided at the center of the chamber and includes a cathode electrode that generates a proton plasma. A series of electrically isolated acceleration rings extend from the cathode electrode and operate to accelerate protons from the proton plasma towards an outer target ring composed of boron eleven ($^{11}$B). The accelerated protons fuse with the $^{11}$B nuclei to generate the alpha particles that then interact with crossed electric and magnetic fields between the target ring and the cavities. The alpha particles resonate with the cavities and generate a current within the resonator that is collected.

20 Claims, 4 Drawing Sheets

ANEUTRONIC MAGNETRON ENERGY GENERATOR

BACKGROUND OF THE INVENTION

1. Field of the Invention

This invention relates generally to an aneutronic magnetron energy generator and, more particularly, to an aneutronic magnetron energy generator that includes a proton plasma as a source of protons that bombard a boron eleven target and cause a fusion-fission reaction to produce alpha particles that resonate in a magnetron to generate microwave energy.

2. Discussion of the Related Art

Modern society uses many and various electrical and mechanical devices that require power to operate. Because of this, everybody wants power that is inexpensive, clean and abundant. However, that trifecta is elusive. Because of the tremendous upside of such a power source, research explores many different types of power generators that may or may not provide improvements.

It is well documented in the literature that a boron eleven ($^{11}B$) atom will disintegrate into three alpha (α) particles (helium nuclei) when impacted by a proton having sufficient energy in a fusion-fission reaction. A simple illustration of this reaction is shown in FIG. 1, where an energetic proton 10 having a suitable energy (speed), such as about 0.675 MeV, is shown colliding with an $^{11}B$ nucleus 12 that includes six neutrons N and five protons P. The proton 10 fuses with the $^{11}B$ nucleus 12 in a fusion reaction to generate a carbon twelve ($^{12}C$) nucleus 14 that includes six neutrons N and six protons P. The $^{12}C$ nucleus 14 is unstable and immediately decays in a fission reaction that generates an alpha particle 16 including two protons P and two neutrons N, which has an energy level of about 4 MeV, and a beryllium eight ($^{8}Be$) nucleus 18 including four protons P and four neutrons N. The $^{8}Be$ nucleus 18 is also unstable and immediately decays in a fission reaction that generates two more alpha particles 20 and 22 that each has energy of about 2.64 MeV. As mentioned, this fusion-fission reaction is well understood by those skilled in the art, and does not generate any harmful radiation, such as beta and gamma radiation.

Cavity magnetrons are well known devices that generate microwaves, and that have various applications, such as radar systems and microwave ovens. A cavity magnetron includes an anode resonator having a central chamber and a number of cavities radially disposed around the chamber, where the cavities may have various shapes and be of various numbers for different applications. A cathode is provided in the central chamber and a magnet provides a magnetic field perpendicular to the plane containing the anode and the cathode. Electrons emitted from the cathode are attracted to and propagate towards the anode resonator, and as they propagate are caused by the magnetic field to follow a spiral path. The anode cavities act as tuned circuits and as the electrons travel past the cavities they induce a resonant, high-frequency radio field in the cavity. The cavities resonate, and emit a radio-frequency energy output that is collected by an electrical collector that provides rf energy to a load. The size and shape of the cavities determines the resonant frequency of the induced currents, and thus, the frequency of the microwaves.

SUMMARY OF THE INVENTION

In accordance with the teachings of the present invention, an aneutronic magnetron energy generator is disclosed that generates microwave energy from a fusion-fission reaction that produces alpha particles in response to a proton colliding with an $^{11}B$ nucleus. The magnetron energy generator includes a magnetron having an anode resonator including a central chamber and a plurality of radially disposed cavities. An alpha particle emitting cathode assembly is provided at the center of the chamber. An rf cathode electrode and hydrogen gas that generates a proton plasma when activated is provided within the alpha particle emitting assembly. A series of electrically isolated acceleration rings symmetrically extend from the rf cathode electrode and operate to accelerate protons from the proton plasma towards an outer target ring composed primarily of boron eleven ($^{11}B$). The accelerated protons fuse with the $^{11}B$ nuclei to generate the alpha particles that then interact with crossed electric and magnetic fields between the target ring and the magnetron anode resonator. The alpha particles resonate by transiting the aperture of the anode cavities and thereby generate a resonant current within the anode cavities that is collected.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an aneutronic magnetron energy generator that generates microwave energy from a fusion-fission reaction that produces alpha particles in response to an $^{11}B$ nucleus being impacted by a proton of sufficient energy is merely exemplary in nature, and is in no way intended to limit the invention or its applications or uses.

Figure 2:
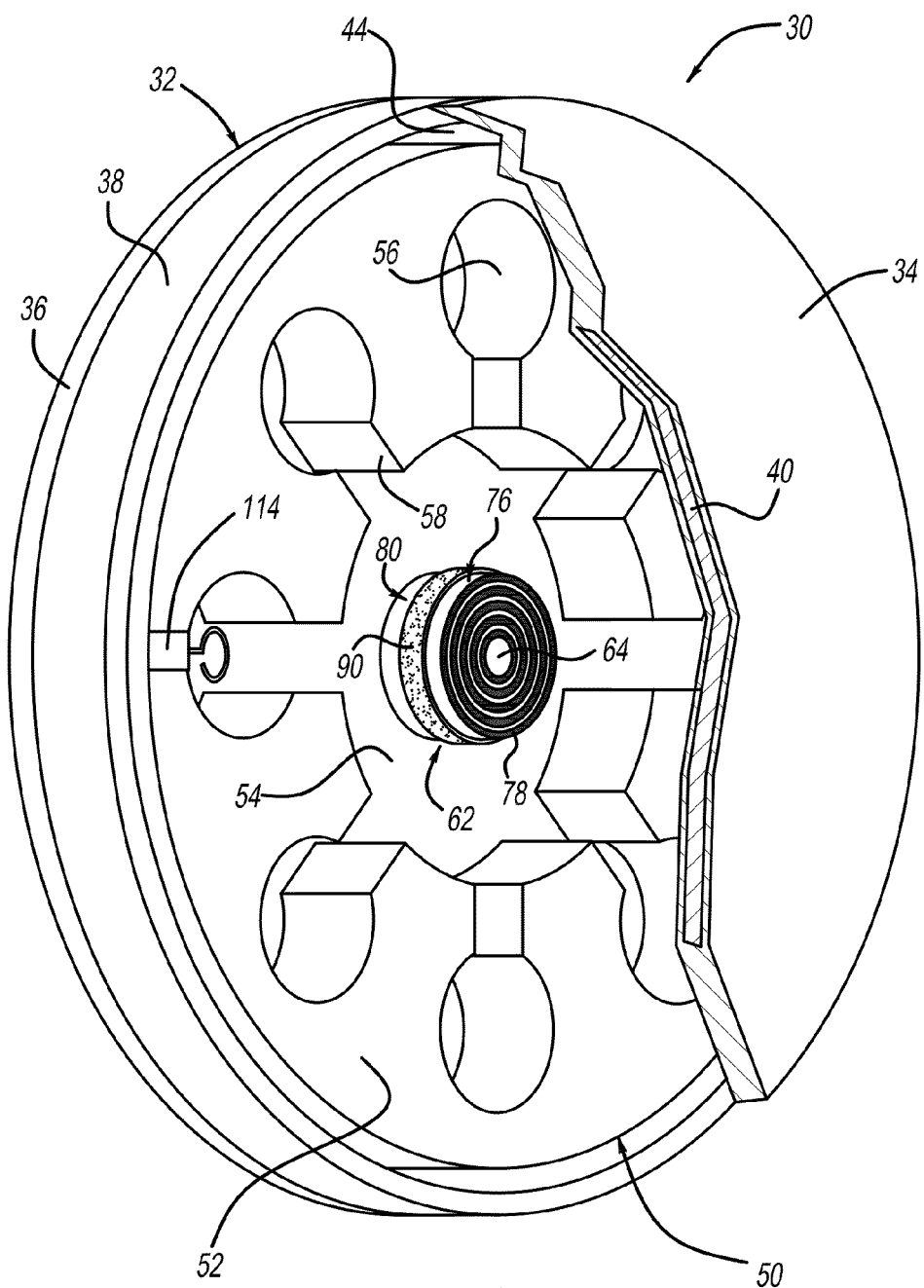
FIG. 2 is a broken-away perspective view of an aneutronic magnetron energy generator.

FIG. 2 is a broken-away, perspective view of an aneutronic magnetron energy generator (AMEG) 30 that generates microwave energy from a fusion-fission reaction that produces alpha particles in response to an $^{11}B$ nucleus being impacted by a proton of sufficient energy in a clean and efficient manner, as will be discussed in detail below. The configuration of the AMEG 30 is one possible implementation of a device that provides energy as a result of this fusion-fission reaction in that other designs and configurations will also be applicable. The AMEG 30 includes an outer cylindrical housing 32 composed of a material suitable for the purposes described herein, such as aluminum, steel, hard plastic, etc. The outer housing 32 includes circular end plates 34 and 36 mounted to the ends of a flat cylindrical member 38. Permanent or other types of magnets are provided within the end plates 34 and 36, respectively, that provide a magnetic field across the AMEG 30 for reasons that will become apparent from the discussion below. The end plate 34 is shown broken-away to expose a magnet 40 therein, where the end plate 36 would also include such a magnet to generate the magnetic field. The outer housing 32 is a sealed structure and defines an internal chamber 44 that is evacuated to provide a vacuum therein, also for reasons that will become apparent from the discussion below.

Figure 3:
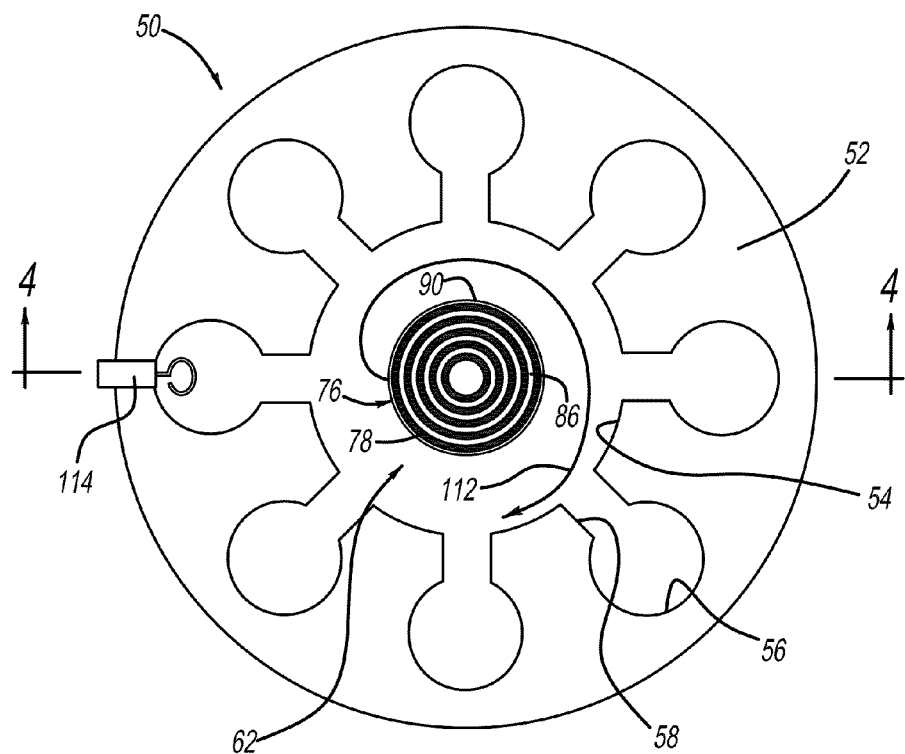
FIG. 3 is a top view of the magnetron separated from the generator shown in FIG. 2.
Figure 4:
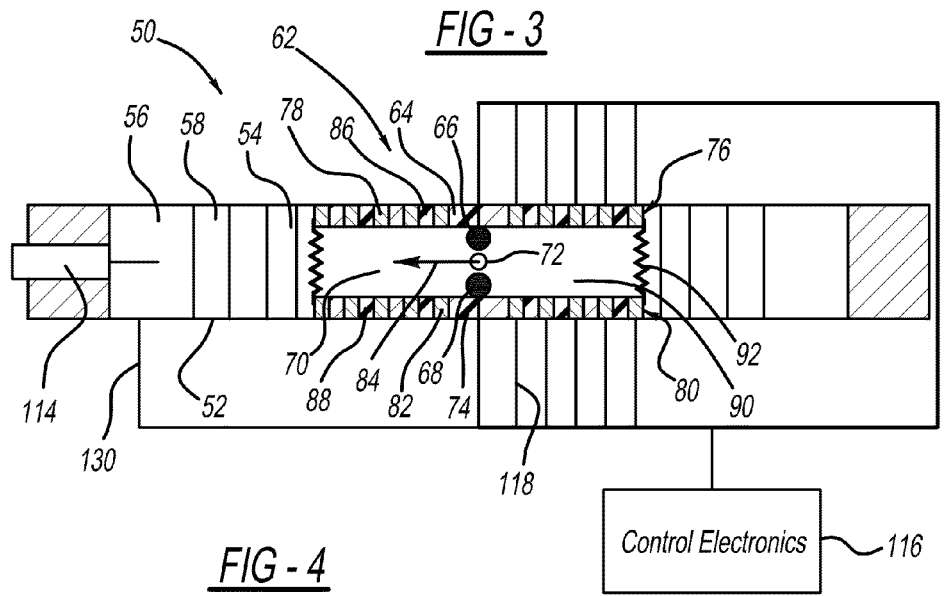
FIG. 4 is a side section view of the magnetron separated from the generator shown in FIG. 2.

A cylindrical magnetron assembly 50 is provided within the chamber 44, where a top view of the magnetron assembly 50 and a side sectional view along line 4-4 of the magnetron assembly 50 separated from the AMEG 30 are shown in FIGS. 3 and 4, respectively. The magnetron assembly 50 includes a flat, cylindrical anode resonator 52 that is a single piece electrically conductive member. The anode resonator 52 can be composed of any electrically conductive material suitable for the purposes described herein, where possible examples include, but are not limited to, copper, copper alloys, aluminum, aluminum alloys, silver, silver alloys, gold, gold alloys, tungsten, tungsten alloys, molybdenum, molybdenum alloys, etc. Further, the anode resonator 52 may have a non-ferromagnetic metallic anti-corrosion coating (not shown). The anode resonator 52 includes a cylindrical center chamber 54 and a plurality of cylindrical cavities 56 circumferentially and symmetrically disposed around the chamber 54. Each cavity 56 is in vacuum communication with the chamber 54 through a slot 58.

In this non-limiting embodiment, the resonator 52 includes eight of the cavities 56. This configuration of an anode resonator in a magnetron is a common design and its operation is well understood. However, as will be appreciated by those skilled in the art, the size of the cavities 56, the number of the cavities 56, the shape of the cavities 56, etc. are all application specific, where other designs, such as strapped magnetron resonator, rising sun resonator, etc., may also be employed. The choice of the resonator design is typically dictated by the desired operating frequency, the difficulty of manufacture, the cost of manufacture, etc.

Figure 5:
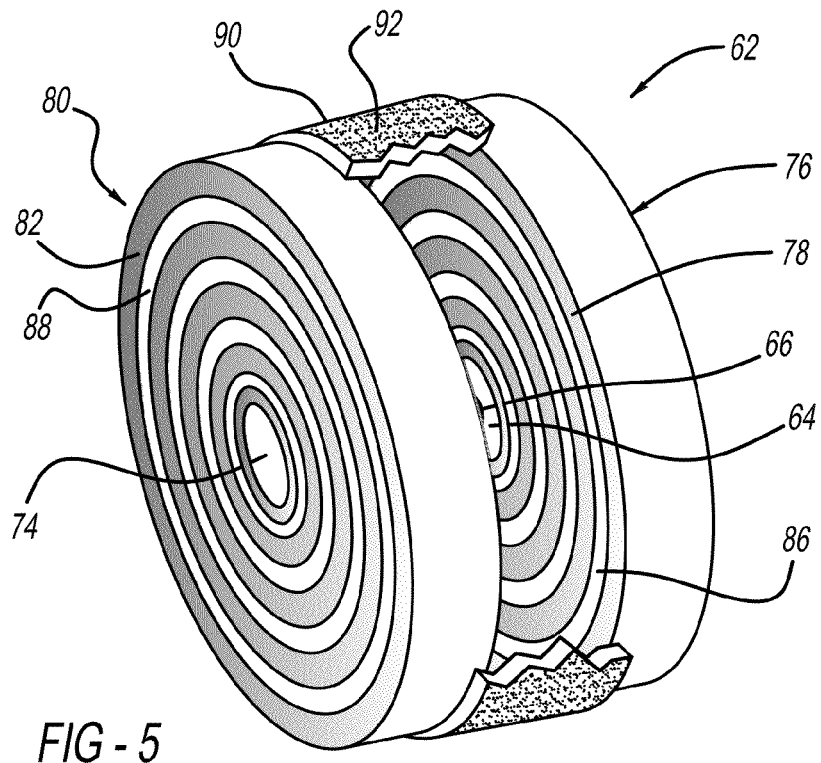
FIG. 5 is a broken-away perspective view of a cathode assembly of the magnetron shown in FIGS. 3 and 4.

The magnetron assembly 50 also includes a cathode assembly 62 positioned at the center of the chamber 54 and having two rf plasma cathode electrodes 66 and 68. A broken-away perspective view of the cathode assembly 62 is shown in FIG. 5. The cathode electrodes 66 and 68 can be composed of any electrical material suitable for the purposes discussed herein, such as molybdenum and tungsten. The cathode assembly 62 includes a first ring set 76 having concentric proton acceleration rings 78 and a second ring set 80 having concentric proton acceleration rings 82 that are positioned parallel to each other and define a gap therebetween. The acceleration rings 78 are separated by insulation separator rings 86 that prevent the acceleration rings 78 from making electrical contact with each other. Likewise, the acceleration rings 82 are separated by insulation separator rings 88 that prevent the acceleration rings 82 from making electrical contact with each other. A center insulator 64 is provided at the center of the first ring set 76 and a center insulator 74 is provided at the center of the second ring set 80. The acceleration rings 78 and 82, the insulation rings 86 and 88 and the center insulators 64 and 74 can be composed of any material suitable for the purposes discussed herein. For example, the acceleration rings 78 and 82 can be made of molybdenum or tungsten, and the center insulators 64 and 74 and the insulation separator rings 86 and 88 can be made of an amorphous chemical vapor deposition (CVD) diamond, a suitable insulating ceramic or glass or an insulating plastic, such as Kapton or other suitable insulating plastic material. In this non-limiting embodiment, each of the ring sets 76 and 80 includes five of the acceleration rings 78 and 82. However, other designs may include more or fewer of the rings for a particular power application.

A thin outer target ring 90 is electrically coupled to the outer most acceleration rings 78 and 82 and extends across the gap between the ring sets 76 and 78. The target ring 90 is composed of pure, or nearly pure, boron eleven, or other suitable fusion-fission target material, such as naturally occurring combined boron eleven and boron ten, that allows the fusion-fission reaction discussed above to occur. The target ring 90 is formed to have surfaces 92 that are textured or roughened so that the orientation and position of the boron atoms within the ring 90 are more randomly and un-symmetrically disposed to provide a greater likelihood that the protons will impact the boron nuclei. The combination of the target ring 90, the center insulators 64 and 74, the acceleration rings 78 and 82 and the insulation separator rings 86 and 88 define a sealed chamber 70. A source of protons, such as a hydrogen gas, is contained within the sealed chamber 70 and provides the protons that are accelerated to an appropriate speed to provide the fusion reaction with the $^{11}$B nuclei, as will be discussed in more detail below. During operation of the AMEG 30, suitable plumbing (not shown) or the like can be provided to continuously inject the hydrogen gas into the chamber 70 so that the source of the protons is continuously replenished.

The magnetron assembly 50 also includes control electronics 116 that provides an electrical signal to the cathode electrodes 64 and 66 and the acceleration rings 78 and 82 on lines 118 consistent with the discussion below. The control electronics 116 also provides a DC bias signal to the anode resonator 52 on line 130 to generate an electric field between the cathode assembly 62 and the anode resonator 52. The electric field lines are perpendicular to the magnetic fields lines provided by the magnets 44 to shape the path of the alpha particles emitted from the target ring 90.

Figure 1:
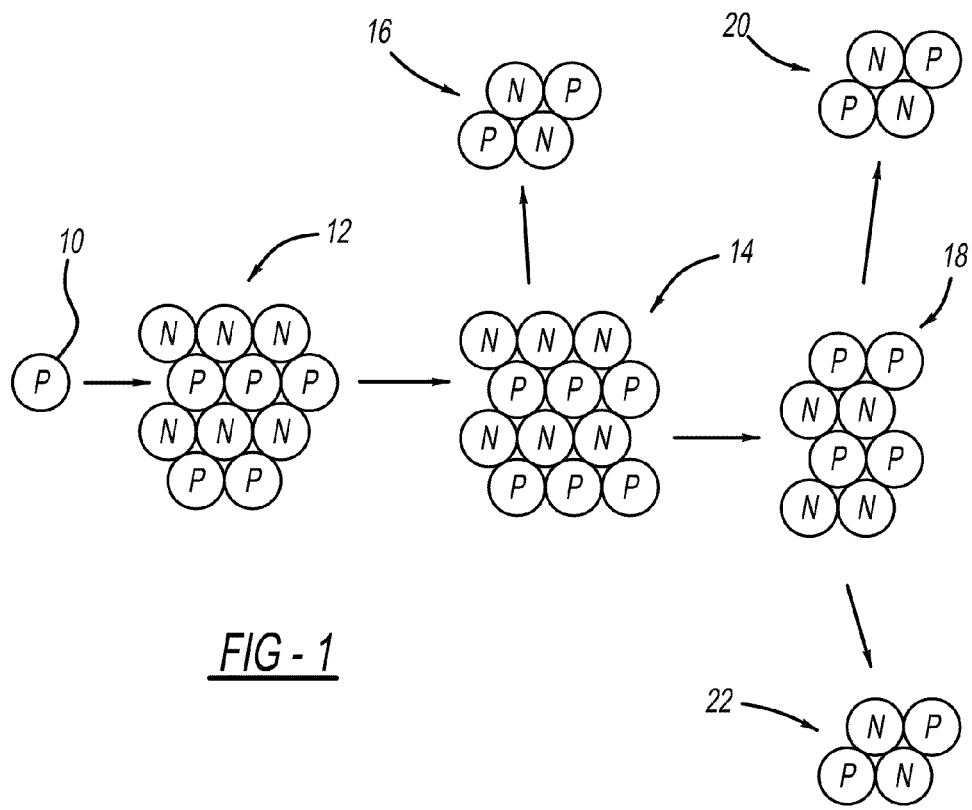
FIG. 1 is an illustration of a fusion-fission reaction that occurs when an $^{11}B$ nucleus is impacted by a proton of sufficient energy.

An rf signal super-imposed on a positive potential is applied to the cathode electrodes 66 and 68 to generate a plasma 72 from the hydrogen gas between the electrodes 66 and 68 that includes free protons and electrons. The free electrons are attracted to and captured by the positive potential electrodes 66 and 68. The free protons are accelerated by the acceleration rings 78 and 82, discussed in more detail below, so that the protons propagate radially outwards represented generally as propagation path 84. The accelerated protons travel into the target ring 90, and as discussed above, each proton that fuses with an $^{11}$B nucleus in the target ring 90 creates an unstable $^{12}$C nucleus, which decays into an alpha particle and an $^{8}$Be nucleus. The $^{8}$Be nucleus rapidly splits into two energetic alpha particles in the reaction discussed above in FIG. 1. Thus, three energetic alpha particles are emitted by each proton/$^{11}$B fusion-fission reaction occurring in the target ring 90. When the alpha particles are emitted, they leave the target ring 90 at fixed energies and in random directions.

Figure 6:
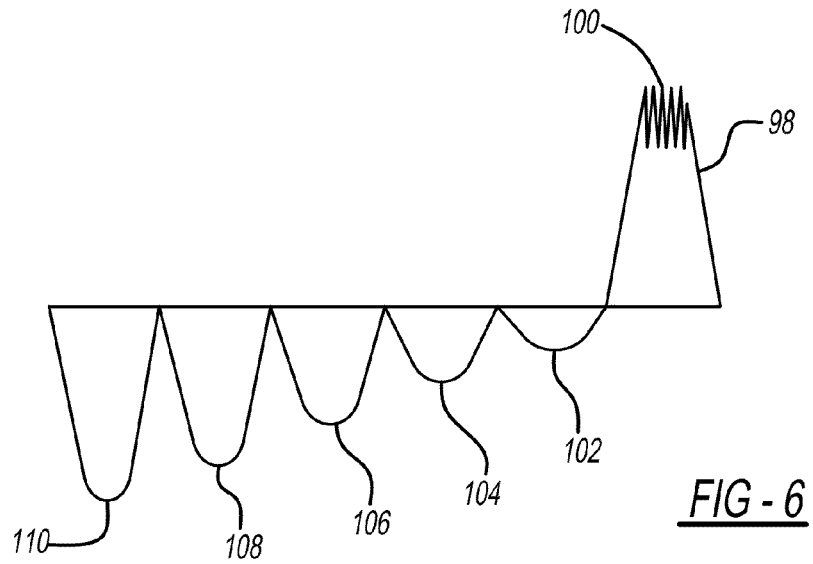
FIG. 6 is a graph showing proton acceleration potentials used in the cathode assembly of the magnetron.

FIG. 6 is a graph showing the potentials applied to the cathode electrodes 66 and 68 and the acceleration rings 78 and 82 from, for example, the control electronics 116. A positive potential, for example, 350 kV, represented by pulse 98, is applied to the cathode electrodes 66 and 68, and an rf signal 100 is super-imposed on the positive potential that excites the hydrogen gas within the chamber 70 to generate the plasma 72 between the electrodes 66 and 68. The plasma 72 is generated by the rf signal 100 at the peak of the acceleration electrode driving signal. The acceleration electrode driving signal is a rising and falling voltage potential applied to the cathode electrodes 66 and 68, the acceleration rings 78 and 82, and the boron ring 90 in unison to draw the protons at the positive potential from the plasma 72 and accelerate them towards the boron ring 90. The potential provided to each of the acceleration rings 78 and 82 negatively increases towards the target ring 90 to increase the kinetic energy of the protons to a level suitable for the fusion-fission reaction. Particularly, the smallest negative potential 102 is applied to the inner most acceleration ring in both of the ring sets 76 and 80, a slightly larger negative potential 104 is applied to the next acceleration ring in both ring sets 76 and 80, and so forth through increasing negative pulses 106 and 108 until the potential 110 applied to the last acceleration ring 78 and 82 that is electrically coupled to the target ring 90 has a voltage potential of about −350 kV. The difference between the starting positive potential of 350 kV and the −350 kV potential at the target ring 90 generates the energy necessary to cause the protons to fuse with the boron nuclei. Through this continuous cyclic process, pulses of protons are emitted from the plasma 72 and into the boron ring 90, and likewise, pulses of alpha particles are directed from the cathode assembly 62 through the crossed electric and magnetic fields between the anode resonator 52 and the cathode assembly 62 to the anode resonator 52. An initial quantity of energy from an outside power source, such as a battery (not shown), applied to the control electronics 116 is required to start the operation of the AMEG 30, but once the AMEG 30 is generating electricity, some of that electricity can then be used to generate the necessary subsequent pulses to operate the AMEG 30.

The alpha particles emitted from the cathode assembly 62 have a large positive kinetic energy. The crossed electric and magnetic fields generated by the DC potential applied to the anode resonator 52 and by the magnets 40 causes the path of the alpha particles to curve in the chamber 54, such as along path 112, between the cathode assembly 62 and the anode resonator 52. In one embodiment, the surface of the anode resonator 52 facing the chamber 54 and the cathode assembly 62 and an outer surface of the cathode assembly 62 are curved relative to each other so that the alpha particles are more focused as they propagate from the cathode assembly 62 to the resonator 52. As the energetic alpha particles travel by the slots 58 and resonate within the cavities 56, a resonant current is induced in the anode resonator 52. The net energy introduced into the anode resonator 52 by the three alpha particles from a single proton/$^{11}$B fusion-fission reaction can be as high as 9.28 MeV, and the net energy released is 9.28− 0.675=8.605 MeV. An energy collector 114 positioned in one of the cavities 56 collects a portion of the resonant microwave energy, which can be electrically coupled to a load to perform work. Pulses of microwave energy are collected by the collector 114 at a certain frequency, which can be converted to a steady-state DC signal. The chamber 44 can be continuously evacuated during operation of the AMEG 30 to remove by-products of the process so as to maintain the vacuum.

Figure 7:
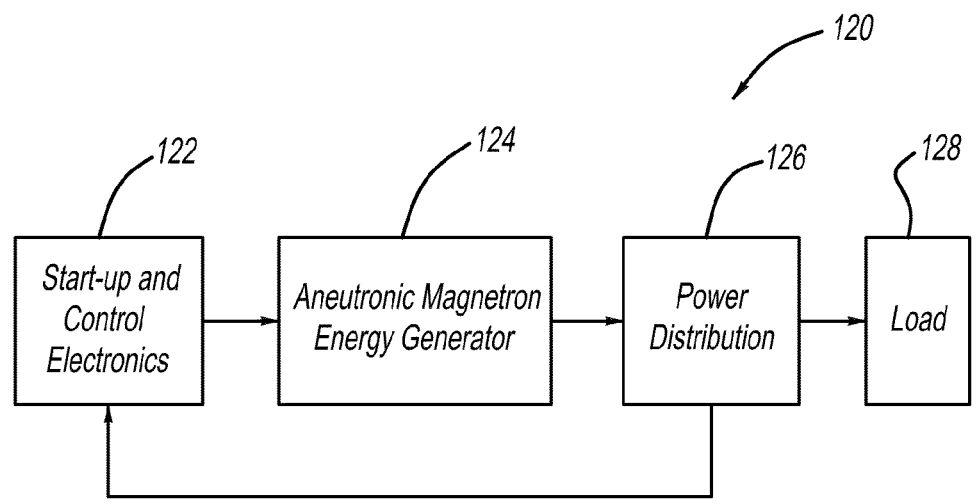
FIG. 7 is a schematic block diagram of a control architecture for the energy generator shown in FIG. 2.

FIG. 7 is a schematic block diagram of a system 120 showing a general architecture for the operation of the AMEG 30. Start-up and control electronics 122 initiate and control the fusion-fission reaction. Box 124 represents the AMEG 30 that generates the microwave energy as discussed above, where the energy is distributed by the collector 114 at box 126 to be sent to a load 128 to perform work. As mentioned above, power from the power distribution can be used to create the plasma once the AMEG 30 is generating power.

Although the magnetron assembly 50 discussed above generates the protons by creating the plasma 72 using the cathode electrodes 66 and 68, other system designs may generate the protons in other ways, such as employing a laser source that heats a hydrogen gas. Further, the particular fusion-fission reaction discussed above for generating the alpha particles is a preferred way of generating the alpha particles. Other fusion and/or fission reactions may also be applicable for generating alpha particles that are then converted into microwave energy in the manner discussed above in the magnetron assembly 50.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fusion-fission machine comprising:
    an outer housing defining a sealed housing chamber therein; and
    a magnetron positioned within the sealed housing chamber, said magnetron including an anode resonator having a central chamber and a plurality of radially disposed cavities around the central chamber that are in communication with the central chamber, said magnetron further including a cathode assembly having a cathode electrode and two sets of a plurality of concentric acceleration rings where the two sets of concentric acceleration rings are parallel to each other and provide an open gap therebetween, said cathode electrode being positioned proximate a center of the sets of concentric acceleration rings within the gap, said cathode electrode being configured to generate a proton plasma, said cathode assembly further including a proton target positioned at a location outside of the acceleration rings from the cathode electrode and extending across the gap, said two sets of concentric acceleration rings being configured to accelerate pulses of the protons in a radial manner through the gap between the two sets of acceleration rings to a speed that causes the proton pulses travelling within the gap between the sets of acceleration rings to collide with nuclei within the proton target to generate and emit alpha particles that are directed towards the anode resonator.

2. The machine according to claim 1 further comprising at least one magnet, said at least one planar magnet positioned within the housing and generating a magnetic field across the magnetron that is crossed with an electric field between the anode resonator and the cathode assembly so that the alpha particles emitted from the target are directed in a spiral path between the anode resonator and the cathode assembly where they resonate and generate a current within the anode resonator.

3. The machine according to claim 2 wherein a surface of the anode resonator facing the central chamber and the cathode assembly and an outer surface of the cathode assembly are configured relative to each other so that the alpha particles are focused as they propagate from the cathode assembly to the resonator.

4. The machine according to claim 2 wherein the magnetron further includes an energy collector that is configured to collect the current generated in the anode resonator.

5. The machine according to claim wherein the target is composed primarily of boron that includes boron nuclei that capture the protons in a fusion reaction and release the alpha particles in a fission reaction.

6. The machine according to claim 5 wherein the boron is selected from the group consisting of pure boron eleven and a mixture of boron eleven and boron ten.

7. The machine according to claim 1 wherein the cathode assembly is a cylindrical assembly.

8. The machine according to claim 1 wherein the plurality of acceleration rings in each set of acceleration rings are separated by insulation rings and are oriented in a same plane as the anode resonator.

9. The machine according to claim 8 wherein the target is a target ring positioned against an outside surface of both of the two sets of acceleration rings.

10. The machine according to claim 9 wherein the two sets of concentric acceleration rings and the target ring form a sealed cathode chamber to confine a material from which the proton plasma is formed.

11. The machine according to claim 1 wherein the target is a target ring having a surface that increases the likelihood that the protons will contact the nuclei.

12. A fusion-fission machine including a magnetron, said magnetron comprising:
  an anode resonator having a central chamber and a plurality of radially disposed cavities around the central chamber that are in communication with the central chamber;
  a cathode assembly having a cathode electrode and two sets of a plurality of concentric acceleration rings where the two sets of concentric acceleration rings are parallel to each other and define an open gap therebetween, said cathode electrode being positioned proximate a center of the sets of concentric acceleration rings within the gap, said cathode electrode being configured to generate a proton plasma, said cathode assembly further including a proton target positioned at a location outside of the acceleration rings from the cathode electrode and extending across the gap, said acceleration rings being configured to accelerate pulses of the protons in a radial manner between the two sets of acceleration rings to a speed that causes the protons pulses travelling within the gap between the sets of acceleration rings to collide with a material within the proton target to generate and emit alpha particles; and
  at least one planar magnet generating a magnetic field across the magnetron that is crossed with an electric field between the anode resonator and the cathode assembly so that the alpha particles emitted from the target are directed in a spiral path between the anode resonator and the cathode assembly where they resonate and generate a current within the anode resonator.

13. The machine according to claim 12 wherein a surface of the anode resonator facing the central chamber and the cathode assembly and an outer surface of the cathode assembly are oriented relative to each other so that the alpha particles are focused as they propagate from the cathode assembly to the resonator.

14. The machine according to claim 13 wherein the target is composed primarily of boron that includes boron nuclei that capture the protons in a fusion reaction and release the alpha particles in a fission reaction.

15. The machine according to claim 14 wherein the boron is selected from the group consisting of pure boron eleven and a mixture of boron eleven and boron ten.

16. A fusion-fission machine comprising:
  a cathode assembly including a cathode electrode and two sets of a plurality of concentric acceleration rings where the two sets of concentric acceleration rings are parallel to each other and define an open gap therebetween, said cathode electrode being positioned proximate a center of the sets of concentric acceleration rings within the gap, said cathode electrode being configured to generate a proton plasma and said two sets of acceleration rings being configured to accelerate pulses of the protons within the gap between the sets of the acceleration rings to a fusion speed;
  a fusion-fission target being impacted by the accelerated proton pulses in a radial manner between the two sets of acceleration rings, said target emitting alpha particles through a fusion-fission reaction; and
  an electrical device responsive to the alpha particles and generating an electrical current.

17. The machine according to claim 16 wherein the target is a target composed primarily of boron eleven.

18. The machine according to claim 16 wherein the electrical device is an anode resonator in a cavity magnetron.

19. The machine according to claim 16 wherein the two sets of concentric acceleration rings and the target form a sealed cathode chamber to confine a material from which the proton plasma is formed.

20. The machine according to claim 16 wherein the target is a target ring positioned against an outside surface of both of the two sets of acceleration rings.

* * * * *